Patented May 1, 1945

2,374,676

UNITED STATES PATENT OFFICE 2,374,676

AMYLACEOUS REACTION PRODUCTS AND METHOD FOR THE PRODUCTION THEREOF

Herbert F. Gardner, Chicago, Ill., assignor, by mesne assignments, to Stein, Hall & Co., Inc., a corporation of New York No Drawing. Application July 28, 1941, Serial No. 404,440

19 Claims. (Cl. 127—38)

This invention relates to new and improved amylaceous reaction products, and to a new and improved method for the preparation thereof.

One of the objects of the invention is to produce amylaceous reaction products having new and improved properties.

Another object of the invention is to provide a new and improved type of amylaceous reaction product which disperses in water to a relatively clear soft paste.

Still another object of the invention is to provide a new and improved type of amylaceous reaction product which disperses in water to form a paste which does not tend to set back, set up, or thicken into a stiff jell over the period of time in which the paste would ordinarily be used or applied.

Still another object of the invention is to provide a new and improved method for producing the products of the character above described.

Other objects will appear hereinafter.

These objects are accomplished in accordance with this invention by the reaction or condensation, at elevated or or relatively high temperatures, of starchy polysaccharide conversion products with water soluble organic hydroxy compounds stable to decomposition under said temperature conditions. The reaction is carried out under substantially dry or non-gelatinizing conditions, that is, in the presence of insufficient moisture to gelatinize or burst the starch granules. In other words, the structure of the starchy polysaccharide is not destroyed but is still visible under a microscope.

In the practice of the invention it has been found that especially good results are obtained by employing as the condensing agent a water soluble alcohol. In general, it has been found that the monohydric alcohols are preferred, that is to say, those alcohols containing only one hydroxyl group. The polyhydric alcohols have some effect, but the effect apparently decreases with an increase in the number of hydroxyl groups. Furthermore, some polyhydric alcohols, as, for example, glycerine, break down into other compounds when heated, and hence, do not give the desired results. In carrying out the invention many different types of alcohols have been employed and among those used there may be mentioned the fatty acid alcohols, as, for example, methyl, ethyl, isopropyl and tertiary butyl alcohols, the unsaturated alcohols, as, for example, allyl alcohols, poly hydroxy aliphatic alcohols, as, for example, ethylene glycol, cyclic saturated alcohols, as, for example, cyclohexanol, phenols, as, for example, phenol itself and resorcinol, alicyclic or aralkyl alcohols, as, for example, benzyl alcohol and other alcohols in the general classes mentioned. As will be observed, the organic hydroxy compounds specifically mentioned above have a molecular weight within the range from 32 to 110, the lowest member in the group being methyl alcohol with a molecular weight of 32, and the highest being resorcinol with a molecular weight of 110.

The term "conversion" as employed herein refers to the degradation or degeneration of raw starches into degraded, degenerated or modified starch derivatives. For the purpose of the present invention, the conversion is preferably effected under substantially dry conditions, for example, by roasting in a closed vessel.

The manner of adding the alcohol or hydroxy compound is subject to some variation and modification. For example, it may be added at the start of the conversion, that is to say, it may be mixed in with the raw starch or starchy polysaccharide to form a blend which is then roasted at an elevated temperature. Secondly, the alcohol may be added at sometime during the conversion, that is to say, the starch or starchy polysaccharide or some intermediate converted product may be subjected to roasting at an elevated temperature and at some point during the roasting process the alcohol or hydroxy compound is added. Thirdly, the starch or starchy polysaccharide may be converted to some predetermined composition, cooled and then reheated to an elevated temperature with the alcohol or hydroxy compound. The alcohol or hydroxy compound may be added by spraying or by blending it in liquid form with the starch or starch conversion product, or in any other suitable manner.

The temperature at which the reaction is carried out may vary, but it is preferable to employ a minimum temperature of at least 250° F. and a maximum temperature such that the reaction product will not char, preferably not more than 450° F. In the practice of the invention, good results have been obtained by carrying out the reaction in an oil heated drum while maintaining the oil at a temperature within the range from about 300° F. to 400° F.

The reaction may be carried out in the presence of a volatile mineral, non-dehydrating acid, or in the absence of any acid. The use of a mineral acid in dextrinization processes is well known. The mineral acid must be diluted to a point where it will not gelatinize the starch, otherwise dark grits will be formed, which may be too small to be screened. The mineral acid should not be a dehydrating acid because a dehydrating acid like sulphuric acid is unsuitable even if diluted. Small amounts of an organic acid such as formic acid, or acetic acid, may be added without departing from the invention. One important use of the products of the present invention is in the preparation of coating colors to be used in coating paper and for this purpose it is preferable to carry out the reaction with no acid, or only a limited quantity of a mineral acid, say, approximately less than 0.1%. For the preparation of other types of products, larger amounts of acid may be used.

The time of conversion may vary depending upon the temperature of the heating and the nature of the conversion apparatus. Thus, it might require a longer time to convert a large quantity of material than a smaller quantity. When the temperature is lowered, the time of conversion is lengthened, and when the temperature is raised, the time of conversion is shortened. At too high a temperature there is danger of darkening the product. A preferred type of product, particularly for paper coating, is one which is taken from the conversion drum at a time just before the color change from white to brown in the conversion normally occurs. This type of product is made either with no acid or a very small amount of acid, as previously indicated. It has a relatively low water solubility, preferably within the range of about 1% to about 20% in distilled water at a temperature of 25° C. Products having similar solubility and viscosity characteristics may be prepared by roasting a starchy polysaccharide with no acid, or a small amount of mineral acid in the manner described, without employing an alcohol or other hydroxy compound for reaction therewith, but the new products prepared in accordance with this invention by the use of an alcohol or hydroxy compound differ markedly from the aforesaid products prepared without an alcohol. For example, in physical properties the alcohol converted products of the present invention are more like chlorinated starches than the products prepared without an alcohol. They are clearer, stay softer, and do not tend to set up into a stiff jell. Hence, they are applicable for use as printing gums while products which are otherwise prepared in a similar manner without the addition of an alcohol or hydroxy compound are not.

The amount of the alcohol or hydroxy compound employed in most instances is within the range of about 1% to about 3%, based on the weight of the starchy polysaccharide. Ordinarily the amount of alcohol necessary to accomplish the result cannot be below about ¼% and would not normally be higher than about 5%. It will be understood of course that larger quantities of alcohol can be employed, but it appears that only a small amount is necessary to accomplish the result. If a volatile alcohol is employed, care must be taken to provide ventilators in order to avoid fire hazards.

The results will vary somewhat with different alcohols or hydroxy compounds. For instance, methyl alcohol ordinarily gives better results than ethyl alcohol. The unsaturated alcohols such as allyl alcohol are inferior to the saturated alcohols, such as methyl and ethyl alcohol. Heterocyclic alcohols, such as furfuryl alcohol, do not give the best results, because they tend to decompose and become dark. Excellent results are obtained with cyclohexanol, sometimes known as hexalin. Phenol, on the other hand, which is very closely related except that it is unsaturated, gives less desirable results.

Since the structural formulae of the products are unknown, the invention can be evaluated only in the terms of the results obtained in a particular field of application. One such field is the paper coating field.

The expression "paper coating" as employed herein, refers to that art wherein an adhesive such as casein, glue, oxidized starch, or the like, is mixed with a mineral material such as clay, calcium carbonate, satin white, blanc fixe, titanium dioxide, zinc sulfide, lithopone, or other pigment with or without solubilizing agents, where necessary, for example, borax and soda ash, to dissolve the casein, or with or without other auxiliary materials to form with water a mixture known as the "coating color," or the "paper coating composition." The coating color is spread out on the paper in a thin film by various methods, for example, by means of brushes or rolls. The film is then dried and the paper is calendered and rolled in the usual manner.

Coated papers were originally developed in response to a demand for a smooth paper for half tone printing. In the half tone process the picture is made up of minute dots and hence, the smoother the paper the more faithful will be the reproduction of the picture. It is desirable to keep the percentage of adhesive as low as possible, because high amounts have adverse effects on color, opacity, ink absorption and other properties, but on the other hand, sufficient adhesive must be present to prevent the pigments from being picked off by tacky inks.

The starchy materials now being used in making coating colors for paper coating compositions are primarily either oxidized starches or enzyme treated starches. Starch degeneration products, such as dextrines, are normally unsuitable for making coating colors because the degeneration of the starch causes the loss of desirable coating characteristics such as adhesive strength and flow.

The invention will be further illustrated but is not limited by the following examples in which the quantities are stated in parts by weight unless otherwise indicated:

*Example I*

An amylaceous conversion product was prepared by spraying 2000 lbs. corn starch with 450 cc. of 18° Bé. hydrochloric acid dissolved in 3 gallons of methanol and 9 gallons of water. The water was added to cut down the inflammability of the alcohol. The above mixture was converted in an oil jacketed drum with the oil at about 400° F. After about 6 or 7 hours the desired viscosity was obtained. The resultant product when mixed with 4 parts of water, heated to 190° F. and cooled to 75° F. gave a viscosity of 30 seconds on the Stormer viscosimeter, using a 500 gram weight, and the high viscosity cup.

Comparative paper coating tests were made with the above product, a chlorinated starch and a product converted similarly to the above product but without the alcohol. In making these tests the clay slip was prepared by mixing together 1500 lbs. of HT coating clay and 900 lbs. of water for 1 hour, then adding 2 to 5 lbs. of tetrasodium pyrophosphate and mixing for another hour. The adhesive base was prepared by mixing together 270 lbs. of the alcohol reaction product prepared as above described and 1080 lbs. of water, heating to 190° F. by indirect steam and cooling. The cooled base material was then added to the clay slip and the resultant mixture diluted to about 37% total solids content. The paper coating compositions were prepared in a similar manner from the chlorinated starch and from a conversion product prepared in a similar way to the alcoholic conversion product but without the addition of the alcohol.

The various coating compositions were then coated upon various types of papers and tested. One of the most important tests made by the coated paper mills is the so-called wax, or pick test. Two series of waxes are commonly used, one being the Dennison series of wax and the other the K and N series. The results obtained with my product will vary slightly, depending upon the starch base used and the kind of paper coated.

In the following description the wax tests refer to the Dennison waxes. These consist of a series of waxes, each member of which is given a numerical value. The use of these waxes is well known and hence, will be described only very briefly. In making the tests with the waxes the paper is coated with a given coating composition and is then tested by applying the heated wax thereto. Each wax is allowed to remain in contact with the coating on the paper for 15 minutes after which it is withdrawn and examined to determine whether or not any of the pigment has been removed or picked off of the coating. If one wax does not remove any pigment, the next higher numbered wax is applied until finally some of the pigment is removed. The tests were repeated three times with each sample in order to obtain an average.

The results of these tests showed that the products of the present invention gave wax tests which were generally comparable numerically to tests obtained with commercial chlorinated starches now being used for coating and having approximately the same viscosity. The results obtained were in general superior to the results obtained with products having a similar viscosity converted under similar conditions, but without the addition of the alcohol. With some types of paper the superior results were much more marked than with others. The superiority was particularly evident on paper containing no size, or on the so-called slack sized paper, that is to say, paper containing a relatively small amount of rosin sizing. The coat weights of the comparative samples were the same.

As an illustration of the comparative results obtained in one series of tests, the wax test of the product of Example I when applied as a coating in the manner previously described to a slack sized paper averaged 6.3. A paper similarly coated with a product having approximately the same viscosity, prepared by a conversion without the addition of the alcohol had an average wax test of only 2.5. The same paper coated with a chlorinated starch of the same viscosity had an average wax test of about 6.0. In another series of tests on a waterleaf paper containing no sizing, the average wax test for the product of Example I was 6.0, that for a product of similar viscosity made without the alcohol was 2.0, and that for the chlorinated corn starch was 6.3.

Another series of tests demonstrated that although all wax test results are apparently somewhat influenced by the humidity of the paper, or the humidity at which the wax test is made, or perhaps both, the products of the present invention were in general less affected by the humidity conditions than similar conversion products made without the alcohol, or than commercial chlorinated starches such as are used for paper coating.

Example II

In this example 2000 parts of corn starch were sprayed with 0.0335% of 18° Bé. hydrochloric acid based upon the weight of the starch, dissolved in 1.16% of methanol, based on the weight of the starch. The mixture was converted in an oil jacketed drum at about 400° F. and after about 6 or 7 hours the desired viscosity was obtained. The viscosity characteristics of the product were similar to those described in connection with Example I.

Example III

In this example the reacting materials were the same as in Example II except that 1.68% of ethanol was employed instead of the methanol. The product had the same general characteristics as the product obtained by the methanol reaction, although to a less marked extent.

Example IV

The reaction in this example was carried out in the same way as in Example II, except that 2.18% of isopropanol, based on the weight of the starch, was employed instead of the methanol. The improved characteristics of the product were in general somewhat similar to those obtained with the ethanol derivative.

Example V

This example was carried out in a manner similar to Example II, except that 2.66% of tertiary butyl alcohol were employed instead of the methanol. This product, like the others, differed markedly from products obtained by a similar conversion but without the butyl alcohol.

Example VI

A reaction product was made in a manner similar to that described in Example II, except that 1.25% of allyl alcohol was employed instead of the methanol. This product gave good wax test results on some intermediate sized paper, but less desirable results than products of Examples I and II on some other types of paper.

Example VII

A product was prepared by reacting together 2000 parts of corn starch and 2% ethylene glycol in the presence of sufficient 18° Bé. hydrochloric acid to give a pH of about 3.3. The reaction product showed certain marked improvements in its properties over similar conversion products made without the addition of the ethylene glycol.

Example VIII

A reaction product was prepared by mixing together 2000 parts of corn starch, 0.0503% of 18° Bé. hydrochloric acid and 2.93% of benzyl alcohol and converting as described in Example II. The resultant product had good paper coating characteristics and improved pasting characteristics as compared to the same conversion product made without the benzyl alcohol.

Example IX

The reaction was carried out as in Example II, except that 1½% of cyclohexanol was substituted for the methyl alcohol. This product gave excellent results both in paper coating compositions and for use in other adhesive purposes, as for example, the back seams of envelopes.

Example X

A reaction product was prepared by first converting the starch to a dextrine, resembling in its characteristics a dextrine known as Stein, Hall Supercote #4, and then heating the dextrine under substantially non-gelatinizing conditions with about 2.3% of methanol to a temperature of about 375° F. until a product having the general viscosity characteristics of a dextrine known as Stein, Hall Supercote #6 was obtained. This product gave excellent results in paper coating compositions compared with regular chlorinated starches in the same general viscosity range.

A conversion was made as in Example IX except that an equivalent amount of phenol was substituted for the cyclohexanol.

Similar conversions were carried out with other organic hydroxy compounds, including resorcinol and furfuryl alcohol, with varying results. The time and temperature of the conversion were also varied in order to produce products of different viscosity characteristics. The colors of the products obtained varied in general from a white to a yellowish tinge.

The invention is applicable to the treatment of any amylaceous material or starchy polysaccharide which gelatinizes when heated in the presence of moisture, including tapioca, potato, sweet potato, sago, corn, rice, oats, wheat, rye and barley. Especially good results have been obtained in the preparation of amylaceous reaction products of the type described from the grain starches, such as corn. For example, a superior library paste was prepared by a dextrine conversion of corn starch with cyclohexanol as compared with ordinary dextrine conversions of corn starch. It is relatively simple to make good quality library pastes from tuber starches like potato and tapioca, but not from corn starch.

Although the mechanism of the reaction is not known, it is believed that the alcohols or organic hydroxy compounds react in some way with the terminal aldehyde groups of the starchy polysaccharide. Some evidence to this effect is afforded by the fact that apparently only a small amount of the organic hydroxy compounds, usually less than 5%, is required in order to bring about the desired reaction. Since it is believed that there are relatively few terminal aldehyde groups in the starch molecule, this would account for the requirement of only a small amount of the organic hydroxy compound in order to react with these aldehyde groups. By reacting with the aldehyde groups it is believed that the organic hydroxy compounds such as the alcohols thereby prevent these aldehyde groups from taking part in other reactions which normally cause the starch to set back to a jell over a period of time. In this way products of improved properties and characteristics are obtained.

As previously indicated, the invention is particularly important in the preparation of paper coating compositions because it provides a new type of amylaceous material which is more cheaply and readily obtainable than present commercial materials such as the chlorinated starches. The latter, in addition to requiring a relatively high chlorine content and the use of special chlorinating chemicals, also require a number of separating steps during their manufacture and in the course of these various steps there is considerable economic loss or waste.

The products of the invention may also be used for adhesive purposes such as the manufacture of back seam gum for envelopes, the manufacture of seam gums for bags and other paper articles, and also as thickeners in textile printing. The products may be converted to a high water solubility or a low water solubility, depending upon the purpose for which they are to be used. Thus, for coating gums it is generally preferable that the product have a relatively low water solubility, while for many adhesive purposes it may have a high water solubility, say, 80% or more.

Having thus described the invention, what I claim as new and desire to secure by Letters Patent of the United States is:

1. A method of producing an improved amylaceous reaction product which comprises reacting an amylaceous material under the influence of heat, under acidic conditions, and under substantially non-gelatinizing conditions at a temperature above about 250° F. but insufficiently high to cause substantial charring of the product, with a water soluble organic hydroxy compound stable to decomposition at the temperature conditions employed.

2. A method of producing an improved amylaceous reaction product which comprises reacting an amylaceous material under acidic conditions at a temperature within the range of about 300° F. to about 450° F. and under substantially non-gelatinizing conditions with a water soluble organic hydroxy compound stable to decomposition at the temperature conditions employed.

3. A method of producing an improved amylaceous reaction product which comprises reacting a substantially undegraded starchy polysaccharide, which is normally gelatinizable when cooked with water, at a temperature above about 250 degrees F. but insufficiently high to cause substantial charring of the product, and under substantially non-gelatinizing conditions in the presence of a minor proportion of a non-dehydrating volatile mineral acid and a minor proportion of a water soluble organic hydroxy compound stable to decomposition at temperatures within the range of about 250° F. to about 450° F.

4. A method of producing an improved amylaceous reaction product which comprises reacting a gelatinizable amylaceous material under the influence of heat, under acidic conditions, and under substantially non-gelatinizing conditions with a monohydric alcohol, said reaction being carried out at a temperature above about 250° F. but below the temperature at which substantial charring begins to occur.

5. A method of producing an improved amylaceous reaction product which comprises reacting a gelatinizable amylaceous material under the influence of heat, under acidic conditions, and under substantially non-gelatinizing conditions with a water soluble polyhydric compound stable to decomposition at the temperature employed, said reaction being carried out at temperatures above about 250° F. but below the temperature at which substantial charring begins to occur.

6. A method of producing an improved amylaceous reaction product which comprises reacting an amylaceous material at temperatures above about 250 degrees F. but insufficiently high to cause substantial charring of the product, under acidic conditions, and under substantially non-gelatinizing conditions with a minor proportion of methanol.

7. A method of producing an improved amylaceous reaction product which comprises reacting an amylaceous material at temperatures above about 250 degrees F. but insufficiently high to cause substantial charring of the product, under acidic conditions, and under substantially non-gelatinizing conditions with a minor proportion of cyclohexanol.

8. A method of producing an improved amylaceous reaction product which comprises reacting a grain starch at a temperature above 250 degrees F. but below the temperature at which substantial charring begins to occur, under acidic conditions, and under substantially non-gelatinizing conditions with a water soluble organic hydroxy compound stable to decomposition at the temperature conditions employed.

9. A method of producing an improved amylaceous reaction product which comprises dextrinizing a corn starch under acidic conditions, at a temperature above about 250 degrees F. but below the temperature at which substantial charring begins to occur, under non-gelatinizing conditions, and in the presence of a minor proportion of a water soluble organic hydroxy compound stable to decomposition at the dextrinization temperatures employed.

10. An improved product having the general characteristics of a partially dextrinized starch but characterized by improved adhesive strength and flow, by improved pasting characteristics and by stability against setting back to a gel, said product being obtainable by reacting an amylaceous substance under acidic conditions with a minor proportion of an alcohol at a temperature above about 250 degrees F. but below temperatures at which substantial charring begins to occur, under substantially non-gelatinizing conditions, said amylaceous substance being one which forms gelatinous dispersions when cooked in water, and said alcohol being one which is stable to decomposition at the temperatures mentioned, the heating being carried out for a substantial period of time until the product exhibits substantial changes in adhesive strength and flow as compared with the original amylaceous substance, excellent pasting characteristics, particularly with regard to increased softness of the paste formed with water, and stability against setting back to a gel in those instances where the original amylaceous substance normally set back to a gel within a relatively short time.

11. An improved product having the general characteristics of a partially dextrinized starch but characterized by improved adhesive strength and flow, by improved pasting characteristics and by stability against setting back to a gel, said product being obtainable by reacting an amylaceous substance under acidic conditions with a minor proportion of a phenol at a temperature above about 250 degrees F. but below temperatures at which substantial charring begins to occur, under substantially non-gelatinizing conditions, said amylaceous substance being one which forms gelatinous dispersions when cooked in water, and said phenol being one which is stable to decomposition at the temperatures mentioned, the heating being carried out for a substantial period of time until the product exhibits substantial changes in adhesive strength and flow as compared with the original amylaceous substance, excellent pasting characteristics, particularly with regard to increased softness of the paste formed with water, and stability against setting back to a gel in those instances where the original amylaceous substance normally set back to a gel within a relatively short time.

12. An improved product having the general characteristics of a partially dextrinized starch but characterized by improved adhesive strength and flow, by improved pasting characteristics and by stability against setting back to a gel, said product being obtainable by reacting a grain starch under acidic conditions with a minor proportion of a monohydric alcohol at a temperature above about 250 degrees F. but below the temperature at which charring begins to occur, under substantially non-gelatinizing conditions, said grain starch being one which forms gelatinous dispersions when cooked in water, and said monohydric alcohol being one which is stable to decomposition at the temperatures mentioned, the heating being carried out for a substantial period of time until the product exhibits substantial changes in adhesive strength and flow as compared with the original grain starch, excellent pasting characteristics, particularly with regard to increased softness of the paste formed with water, and stability against setting back to a gel in those instances where the original grain starch normally set back to a gel within a relatively short time.

13. An improved product having the general characteristics of a partially dextrinized starch but characterized by improved adhesive strength and flow, by improved pasting characteristics and by stability against setting back to a gel, said product being obtainable by reacting a corn starch under acidic conditions with a minor proportion of a monohydric alcohol at a temperature above about 250 degrees F. but below the temperature at which charring begins to occur, under substantially non-gelatinizing conditions, said corn starch being one which forms gelatinous dispersions when cooked in water, and said monohydric alcohol being one which is stable to decomposition at the temperatures mentioned, the heating being carried out for a substantial period of time until the product exhibits substantial changes in adhesive strength and flow as compared with the original corn starch, excellent pasting characteristics, particularly with regard to increased softness of the paste formed with water, and stability against setting back to a gel in those instances where the original corn starch normally set back to a gel within a relatively short time.

14. An improved product having the general characteristics of a partially dextrinized starch but characterized by improved adhesive strength and flow, by improved pasting characteristics and by stability against setting back to a gel, said product being obtainable by reacting an amylaceous substance under acidic conditions with a minor proportion of methanol at a temperature above about 250 degrees F. but below temperatures at which substantial charring begins to occur, under substantially non-gelatinizing conditions, said amylaceous substance being one which forms gelatinous dispersions when cooked in water, the heating being carried out for a substantial period of time until the product exhibits substantial changes in adhesive strength and flow as compared with the original amylaceous substance, excellent pasting characteristics, particularly with regard to increased softness of the paste formed with water, and stability against setting back to a gel in those instances where the original amylaceous substance normally set back to a gel within a relatively short time.

15. An improved product having the general characteristics of a partially dextrinized starch but characterized by improved adhesive strength and flow, by improved pasting characteristics and by stability against setting back to a gel, said product being obtainable by reacting an amylaceous substance under acidic conditions with a minor proportion of cyclohexanol at a temperature above about 250 degrees F. but below temperatures at which substantial charring begins to occur, under substantially non-gelatinizing conditions, said amylaceous substance being one which forms gelatinous dispersions when cooked in water, the heating being carried out for a substantial period of time until the product exhibits substantial changes in adhesive strength and flow as compared with the original amylaceous substance, excellent pasting characteristics, particularly with regard to increased softness of the paste formed with water, and stability against setting back to a gel in those instances where the original amylaceous substance normally set back to a gel within a relatively short time.

16. A partially dextrinized starchy polysaccharide reacted under acidic conditions with about 1% to about 5% of methanol at temperatures above about 250 degrees F. but below temperatures at which substantial charring begins to occur and under non-gelatinizing conditions.

17. A partially dextrinized starchy polysaccharide reacted under acidic conditions with about 1% to about 5% of cyclohexanol at temperatures about about 250 degrees F. but below temperatures at which substantial charring begins to occur and under non-gelatinizing conditions.

18. A method of producing a reaction product by the reaction of an amylaceous substance, which forms gelatinous dispersions when cooked in water, with an organic hydroxy compound having a molecular weight within the range from 32 to 110 and which is stable to decomposition at temperatures from 250° F. to 450° F. which comprises heating said amylaceous substance with a minor proportion of said organic hydroxy compound, under acidic conditions, in the presence of insufficient moisture to cause gelatinization of the amylaceous substance, at a temperature above about 250° F. but not greater than about 450° F., for a substantial period of time until the product exhibits improved adhesive strength and flow as compared with the original amylaceous substance, said product being characterized particularly by its stability against setting back to a gel and the comparative softness of pastes formed therefrom with water.

19. An improved product having the general characteristics of a partially dextrinized starch but characterized by improved adhesive strength and flow, by improved pasting characteristics and by stability against setting back to a gel, said product being produced by reacting an amylaceous substance under acidic conditions with a minor proportion of an organic hydroxy compound, at a temperature within the range from 250° F. to 450° F., under substantially non-gelatinizing conditions, said amylaceous substance being one which forms gelatinous dispersions when cooked in water, and said organic hydroxy compound being one which is stable to decomposition at the temperatures mentioned, the heating being carried out for a substantial period of time until the product exhibits substantial changes in adhesive strength and flow as compared with the original amylaceous substance, excellent pasting characteristics particularly with regard to increased softness of the pastes formed with water, and stability against setting back to a gel in those instances where the original amylaceous substance normally set back to a gel within a relatively short time.

HERBERT F. GARDNER.